US008660835B2

(12) United States Patent
Mousaad

(10) Patent No.: US 8,660,835 B2
(45) Date of Patent: Feb. 25, 2014

(54) SYSTEM AND A METHOD FOR AUTOMATICALLY DETECTING TEXT TYPE AND TEXT ORIENTATION OF A BIDIRECTIONAL (BIDI) TEXT

(75) Inventor: Ahmed Mousaad, Giza (EG)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 12/916,204

(22) Filed: Oct. 29, 2010

(65) Prior Publication Data

US 2011/0106524 A1 May 5, 2011

(51) Int. Cl.
*G06F 17/20* (2006.01)
(52) U.S. Cl.
USPC .......................................................... 704/8
(58) Field of Classification Search
USPC ....................................................... 704/207
See application file for complete search history.

(56) References Cited

U.S. PATENT DOCUMENTS

| | | | | |
|---|---|---|---|---|
| 6,275,789 | B1* | 8/2001 | Moser et al. | 704/7 |
| 6,493,735 | B1* | 12/2002 | Kumhyr | 715/236 |
| 7,086,004 | B2* | 8/2006 | Atkin | 715/205 |
| 7,120,900 | B2* | 10/2006 | Atkin | 717/117 |
| 7,293,229 | B2 | 11/2007 | Feinberg | |
| 2004/0249627 | A1* | 12/2004 | Mirkin | 704/3 |
| 2006/0106593 | A1* | 5/2006 | Schultz et al. | 704/5 |
| 2008/0025610 | A1 | 1/2008 | Abdulkader | |
| 2008/0262830 | A1* | 10/2008 | Flam | 704/8 |
| 2012/0109635 | A1* | 5/2012 | Winkler | 704/8 |

OTHER PUBLICATIONS

Unicode, available at: http://unicode.org/, last accessed Oct. 29, 2010, 6 pages.
"Unicode Bidirectional Algorithm" Unicode Technical Reports, Unicode Standard Annex #9, (Sep. 27, 2010), available at: http://www.unicode.org/reports/tr9/, last accessed Oct. 29, 2010, 31 pages.
"Using Bidirectional (BiDi) Support for Sensors and the Bulk Load Program" Application Dependency Discovery Manager, Version 7.1, available at: http://publib.boulder.ibm.com/infocenter/tivihelp/v10r1/index.jsp?topic=/com.ibm.taddm.doc_7.1/UserGuide/c_cmdb_bidioverview.html, last accessed Oct. 29, 2010, 2 pages.
"Microsoft IE7 Reading Feeds in Right-to-Left Order" Microsoft RSS Blog, available at: http://blogs.msdn.com/rssteam/archive/2007/05/17/reading-feeds-in-right-to-left-order.aspx, last accessed Oct. 29, 2010, 4 pages.
IBM Globalization Web Site, available at: http://w3-03.ibm.com/globalization/page/2775.
IBM Globalization Implementation Guide (Notes' DB D25WEB1/25/A/IBM).

* cited by examiner

*Primary Examiner* — Jakieda Jackson
(74) *Attorney, Agent, or Firm* — Jeffrey T. Holman

(57) ABSTRACT

A method for processing a bidirectional text is described. The method includes: dividing the text into a set of words; determining a first parameter representing a number of non-bidirectional words in the text, a second parameter representing a number of bidirectional words in the text, a third parameter representing a number of non-bidirectional words in reverse letter order in the text, and a fourth parameter representing a number of bidirectional words in reverse letter order in the text; and determining a text type attribute and/or a text orientation attribute of the bi-directional text from the values of the first parameter, of the second parameter, of the third parameter and the fourth parameters.

20 Claims, 7 Drawing Sheets

T1

| E | n | g | l | i | s | h |  | t | e | x | t |  | ي | ب | ر | ع |  | ت | ا | م | ل | ك |
|---|---|---|---|---|---|---|---|---|---|---|---|---|---|---|---|---|---|---|---|---|---|---|
| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |

T2

| t | x | e | t |  | h | s | i | l | g | n | E |  | ي | ب | ر | ع |  | ت | ا | م | ل | ك |
|---|---|---|---|---|---|---|---|---|---|---|---|---|---|---|---|---|---|---|---|---|---|---|
| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |

FIGURE 1A
(Prior art)

SYSTEM AND A METHOD FOR AUTOMATICALLY DETECTING TEXT TYPE AND TEXT ORIENTATION OF A BIDIRECTIONAL (BIDI) TEXT

CROSS-REFERENCE TO RELATED APPLICATIONS

This application claims the benefit of priority of European Patent Application No. 09174680.0 entitled "A System and a Method for Automatically Detecting Text Type and Text Orientation of a Bidirectional (BIDI) Text," which was filed on Oct. 30, 2009, and is hereby incorporated by reference.

BACKGROUND

Most written languages in the world such as Latin (or Cyrillic or Greek) text are written in a direction from left to right (LTR). However, some other written languages such as Arabic, Hebrew, Urdu, and Farsi (Persian) are written in a direction from right to left (RTL). When a text includes both LTR text segments and RTL text segments, each type of text should be written in its own direction, thus forming a bidirectional text, also known as "BIDI". A computer system having a BIDI support capability can display texts of different languages on a same page, even if the languages have different text directionalities.

However, BIDI rules are very complex, and the rules implemented by different software are usually not unified. Indeed, a same script can contain two or more kinds of texts having different writing directions, or texts having different writing directions can refer to each other or even refer in a multi-layer way, or a BIDI document can contain special texts such as dates, numbers, formulae etc.

BIDI data stored on legacy systems (e.g. mainframes systems) used to be in "visual" layout: the data were stored in memory like how they are shown on displays (usually terminals or printers). This had the advantage that no special processing was needed to format the data for presentation, since it was already in presentation form. Since the data only existed on the same platform, it did not matter what form was used. With the advent of processing power closer to end users, the new personal computer systems now mainly store the BIDI data in a logical way. This means that the data is stored in memory in the order they are typed, not how they are displayed. This has the advantage that BIDI data can be processed as non-BIDI data (i.e. searching, sorting and parsing can be done using same modules used with non-BIDI data). In order to display the BIDI data, the system may render the data for presentation which is usually done using BIDI Layout Engines (for text environment) or BIDI Layout Engines embedded in font (for Graphical Environment). Since the data only exists on the personal computer, it does not generally matter what form is used.

Certain text processing algorithms, like search and sort algorithms, differ according to the text type and orientation. The text orientation also called "base direction, "Global orientation", "writing order", "reading order" or "paragraph orientation", determines the side of the screen, window, page, or field where the rendering engine starts laying out directional segments. The next segments progress in the direction of the global orientation. If a bidirectional text has been created in storage with the intent to be presented in a right-to-left global orientation, and is instead rendered with a left-to-right global orientation, the relative order of the different segments (and of the punctuation) gets mixed up and the text does not make sense. The text orientation therefore determines the flow of words writing or displaying and may be either LTR or RTL.

Text type and text orientation are generally defined manually by the system administrator or application user for bi-directional data exchanges between different systems relying on different BIDI layout. To define the text type and orientation, a GUI may be added to the application to allow users to input the text type and text orientation. A GUI may be required to change the methods parameters of the application (APIs) to define the text type and orientation attributes, which can be costly, and cumbersome. Further, in certain situations, manual configuration is not even possible (e.g. there are many sources and it is difficult to configure BIDI layout for each of them, or all source text is received from a specific queue). In such situations, the text may be corrupted.

Text type and orientation are also required for text processing such as text display, text search, text sorting, etc. If the text type and orientation are not known for a bidirectional text, the text processing cannot be performed correctly.

FIG. 1A shows a table T1 representing an exemplary memory buffer storing a text according to Visual text type and RTL text orientation. In visual RTL text type and orientation, the text is displayed in the same order of the characters order.

The memory buffer of table T1 may be displayed in the same character sequences because the text type is visual and orientation is RTL, but when displaying the above memory buffer in a logical environment, the buffer may be corrupted and displayed according to the sequence represented in table T2.

Indeed, the segment "English text" is written in reversed letter sequence in the representation of table T2 because the environment cannot detect the text type and orientation which leads to incorrect segment display.

SUMMARY

In order to address these and other problems, there is provided a method for processing a BIDI text according to the appended independent claim 1, a computer program product, and a system. Other embodiments are defined in the appended dependent claims.

Embodiments of the invention allow for automatic detection of a text type and orientation in a BIDI text, and obviate the need for a manual text type and text orientation input by the system administrator or application user, thereby providing an efficient asynchronous process.

With some embodiments of the invention, no graphical user interface (GUI) is required for inputting the text type and orientation and/or for changing the methods parameters (APIs) to add the text type and orientation attributes. This accordingly reduces human errors and the costs related to editions of applications configured to work with different types of text.

Further advantages of the method and system described herein will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which:

FIG. 1A shows two exemplary representations of a same text according to the prior art.

It is noted that the drawings of the various embodiments described herein are not necessarily to scale. The drawings are merely schematic representations, not intended to portray specific parameters of the embodiments. The drawings are intended to depict only typical embodiments of the invention, and therefore should not be considered as limiting the scope of the invention.

As they may be cited in the following description, IBM zseries, IBM iseries, IBM Z/OS are trademarks or registered trademarks of International Business Machine Corp., in many jurisdictions worldwide, and Windows is a registered trademark of Microsoft Corporation in the United States and other countries.

DETAILED DESCRIPTION

Figure 1B:
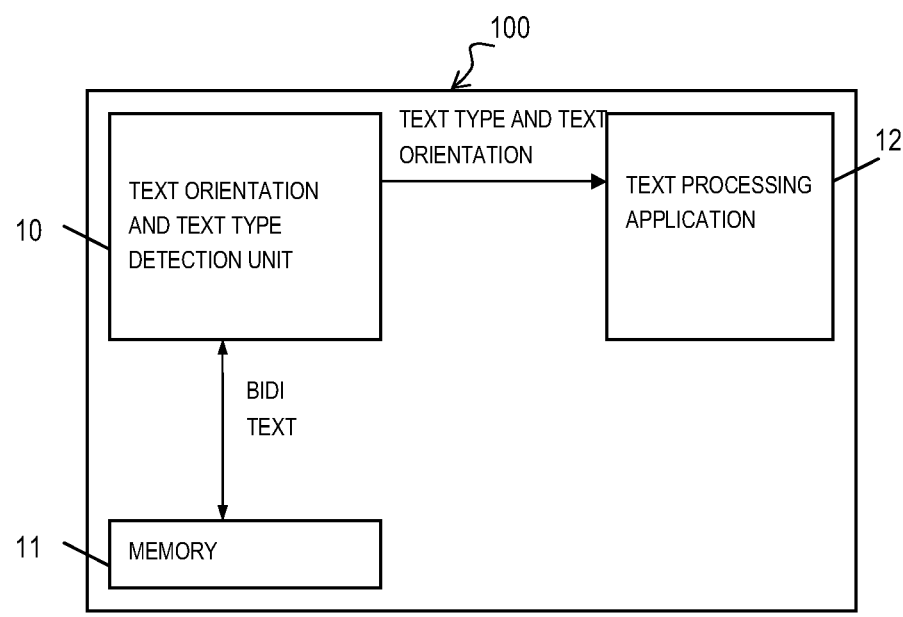
FIG. 1B is a high level diagram showing a system for detecting text orientation and text type attributes according to the invention.

FIG. 1B illustrates a computer system 100 for detecting text type and text orientation attributes according to the invention. The computer system 100 may include a CPU, a display interacting with a rendering engine to renders input text, a keyboard, a mouse and a network connection.

The system 100 includes a text orientation and text type detection unit 10 configured to receive a bidirectional text and detect the text orientation attribute and text type attribute of the input text. The input BIDI language may consist essentially of right-to-left text with some left-to-right nested portions, such as an Arabic text with some information in French, or vice versa. Embodiments of the present invention are adapted to any language, such as any languages Arabic, Hebrew, English, French, Russian, African, Japanese, etc.

The text orientation attribute, also referred to as writing order, reading order, base direction or global orientation, determines the side of display (screen, window, page, or field) where the rendering engine starts laying out directional segments. The next segments progress in the direction of the text orientation. It may have an RTL value (Right To Left) or an LTR value (Left To Right).

The text orientation determines the flow of words writing or displaying. There are two types of orientations:

- LTR (Left To Right) orientation, which indicates that the word writing or displaying is from left to right, like for Latin languages such as English, French, German . . . LTR languages or script will be referred thereinafter as non-BIDI text;
- RTL (Right to Left) orientation, which indicates that the words writing or displaying is from right to left, like some non-Latin languages such as Arabic, Hebrew, Urdu . . . . These languages or scripts will be referred to thereinafter as BIDI text.

The text-type attribute also called "ordering scheme" is defined as the order in which bidirectional text is stored and processed. There are two main text types: visual (or physical), logical (also called implicit).

Visual text-type is the oldest ordering scheme and is more or less a simple copy of the entire screen. In other words, the text is displayed as it is stored in memory. In the visual ordering scheme, the programmer is required to know the exact structure of the data in order to handle by himself each and every segment.

Logical text-type assumes that the letters of the Latin alphabet have inherent left-to-right directionality and that Arabic, Persian, Urdu, and Hebrew characters have inherent right-to-left directionality. According to a logical text type, the text is not displayed as it is stored in memory.

When a user enters a BIDI text, this text is stored in memory 11 in digital Unicode format according to the computer system layout. When the computer system 100 is requested to run a text processing application on the BIDI text such as a search application, a sorting application, etc., the text is retrieved from the memory 11 and passed to the text type and text orientation detection unit 10 for detection of the text type and text orientation attributes. The text type and orientation thus detected are passed to the text processing application that will use this parameter for processing the text. For example, in a situation where a user works in a logical environment and wants to search for a specific word in a text, if the detection unit detects that the text type is VISUAL, the user will convert his word from logical layout into visual layout to be compatible with the text type and get a correct result.

In other applications of the invention, the computer system 100 may receive directly the BIDI text in a particular layout format from another system or environment or platform. In such applications the BIDI text in the original layout format would be directly processed by the detection unit 10 for detection of the text attribute and text orientation attribute. The obtained attributes could be then used to convert the received BIDI text into the layout format of the destination computer system 100.

Figure 2:
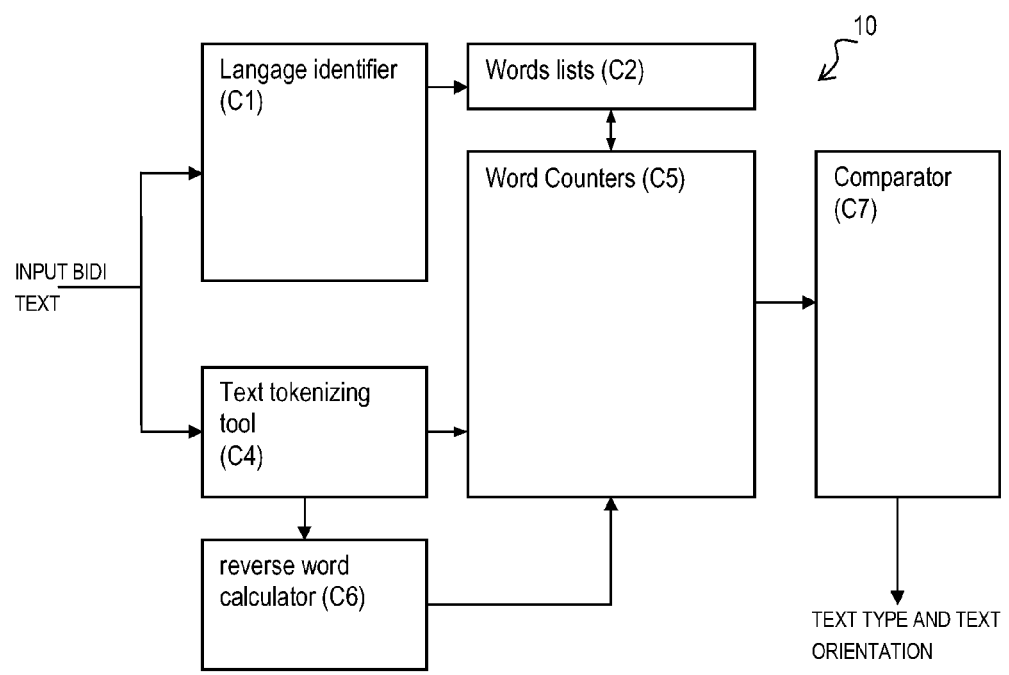
FIG. 2 schematically illustrates the components of the system for detecting text orientation and text type attributes according to certain embodiments of the invention.

FIG. 2 represents the structure of the detection block 10 according to certain embodiments of the invention. The detection block 10 includes a set of word lists or dictionaries C2 in different languages that are used to load words of lists based on the languages used in the text. The detection block 10 further includes a language identifier C1 to identify the languages contained in the text and use this information to load the required word lists C2. The detection block 10 also interacts with a text tokenizing tool C4 to tokenize the text into a set of words and explore the obtained set of words. The detection block 10 is further connected to a reverse word calculator C6 to determine the reverse words of selected words in the input BIDI text. Word counters C5 are further provided to determine four BIDI parameters using the set of words provided by the text tokenizing tool C4, the reverse word calculator C6 and the loaded word lists C2. The BIDI parameters thus obtained are compared by comparator C7 to determine the text type attribute and the text orientation attribute.

Figure 3:
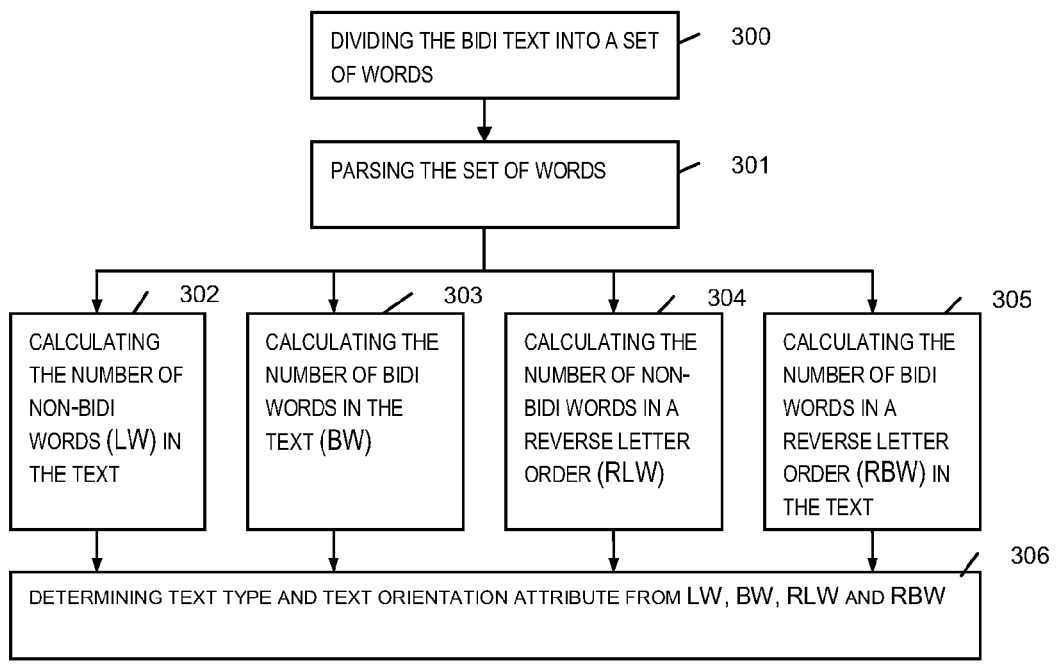
FIG. 3 shows a general flowchart for detecting text type and text orientation attributes according to the embodiments of the invention.

FIG. 3 is a flowchart illustrating the operation of the detection block 10 in accordance with embodiments of the present invention.

In step 300, the BIDI text is first divided into a set of words.

In step 301, the set of words is parsed to compute a first BIDI parameter representing the number of non-BIDI words (LW) in the text (step 302), a second BIDI parameter representing the number of BIDI words (BW) in the text (step 303), a third BIDI parameter representing the number of non-BIDI words in a reverse letter order (RLW) in the text (step 304), and a fourth BIDI parameter representing the number of BIDI words in a reverse letter order RBW in the text (step 305)

Step 306 then determines the text type attribute and the text orientation attribute of the bi-directional text from the values of the first parameter LW, of the second parameter BW, of the third parameter RBW and of the fourth parameter RBW.

The expression "BIDI word" or "bidirectional word" as used in the present description designates a word that consists of Bidi characters (like for example Arabic or Hebrew words).

The expression "BIDI character" or "bidirectional character" refers to any character that relates to a Bidi languages (like Arabic or Hebrew Alf Bet characters), while the expression a "BIDI language" or "bidirectional language" should be understood as designating any language that is written from right to left, such as for example Arabic, Hebrew Farsi, Urdu, etc. languages.

Further, the expression "non-bidi word" or "non-bidirectional word" as used herein designates any word consisting of characters that do not relate to Bidi languages (like for example English, French, German, Japanese, Indian, etc. words).

Figure 4:
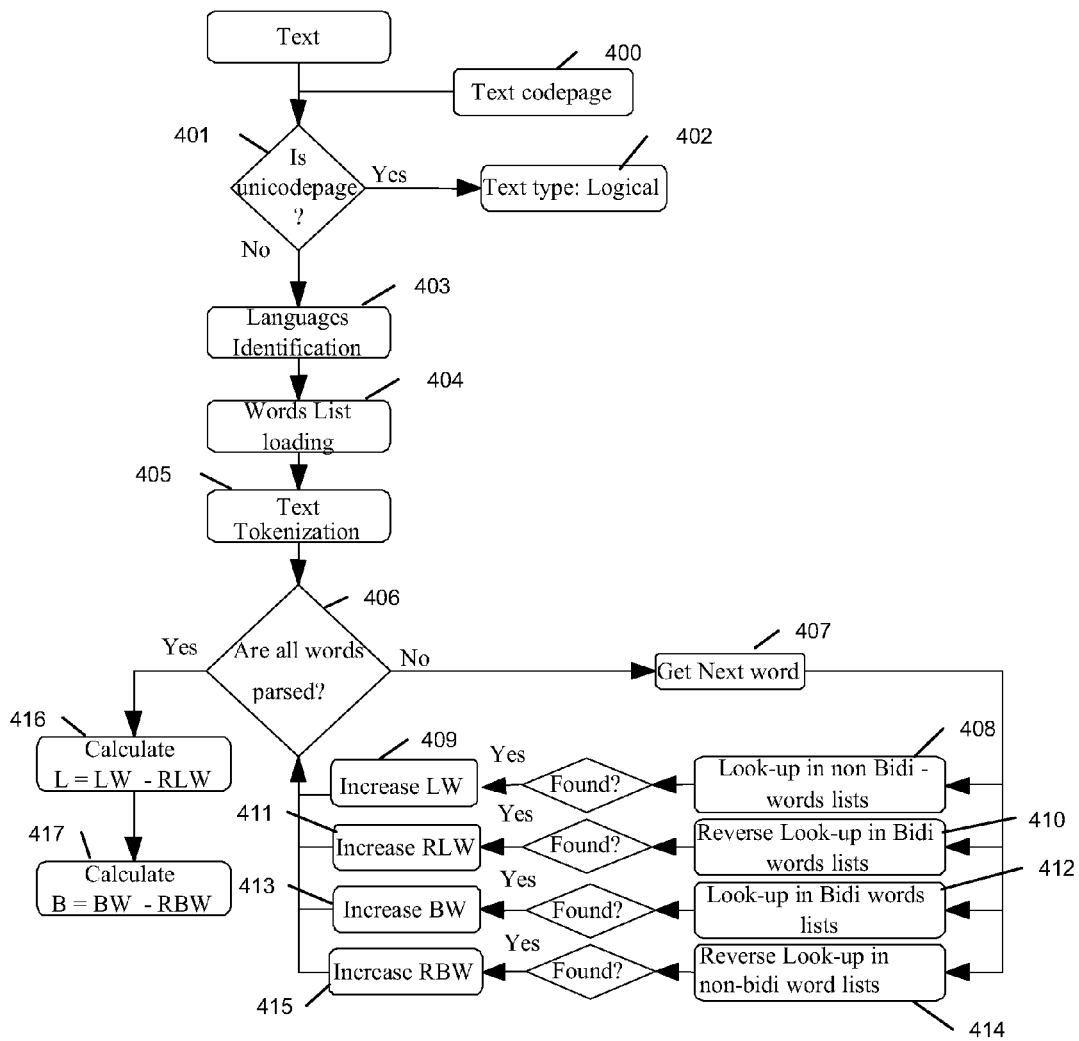
FIG. 4 shows a flowchart for determining the BIDI parameters LB, RW, RLW, LBW, according to certain embodiments.

FIG. 4 is a flowchart illustrating in more details the determination of the four BIDI parameters according to certain embodiments of the invention.

Steps 400 and 401 first check the text code page or character encoding type. The text code page represents a list of selected character codes in a certain order. Vendors generally allocate their own code page number to a character encoding, even if it is better known by another name (for example utf-8 character encoding has code page numbers 1208 at IBM, 65001 at Microsoft, 4110 at SAP). Codepages are usually defined to support specific languages or groups of languages which share common writing systems. For example, codepage 1253 provides character codes required in the Greek writing system. If it is determined in steps 400 and 401 that the code page is a Unicode code page ("unicodepage"), the text type is determined as logical in step 402. Otherwise, step 403 identifies the languages included in the text according to codepage (for example, an English essay contains Arabic aphorism).

Step 404 loads the words lists for the identified languages. These lists may be embodied as dictionaries.

Embodiments of the invention propose to distinguish between BIDI (Bidirectional) languages and Non-BIDI languages to detect the text type and text orientation attributes.

In step 405, the BIDI text is then tokenized into words and the set of words thus obtained is parsed in step 406 starting with the first word in step 407.

While all the words of the text have not yet been processed (step 406), for each word in the text set of words, the word is searched for in the identified non-BIDI languages words lists (dictionaries) in step 408. If the word is found in the non-BIDI lists, then the non-BIDI word counter LW is increased in step 409.

Step 410 reverses the word (for example the word "bird" will be "drib") and searches for the reversed word in the identified non-BIDI languages words lists. If the reversed word is found in the BIDI word list, then the counter for the non-BIDI words in a reverse letter order RLW is increased in step 411.

Step 412 searches for the current word in the BIDI languages words lists (dictionaries). If the word is found in the BIDI list, then the counter for the BIDI words BW is increased in step 413.

Step 414 searches for the reversed word in the identified BIDI languages words lists. If the reversed word is found in the identified BIDI word lists, then the counter for the BIDI words in a reverse letter order RBW is increased in step 415.

When all the words of the text have been parsed (step 406), the difference L between the number of non-BIDI words LW and the number of non-BIDI words in a reverse letter order RLW is calculated in step 416 (L=LW−RLW) and the difference B between the number of BIDI words BW and the number of BIDI words in a reverse letter order BLW is calculated in step 417 (B=BW−RBW). Even if step 417 is represented as being performed after step 416, alternatively these steps could be performed simultaneously or in a reverse order.

Figure 5:
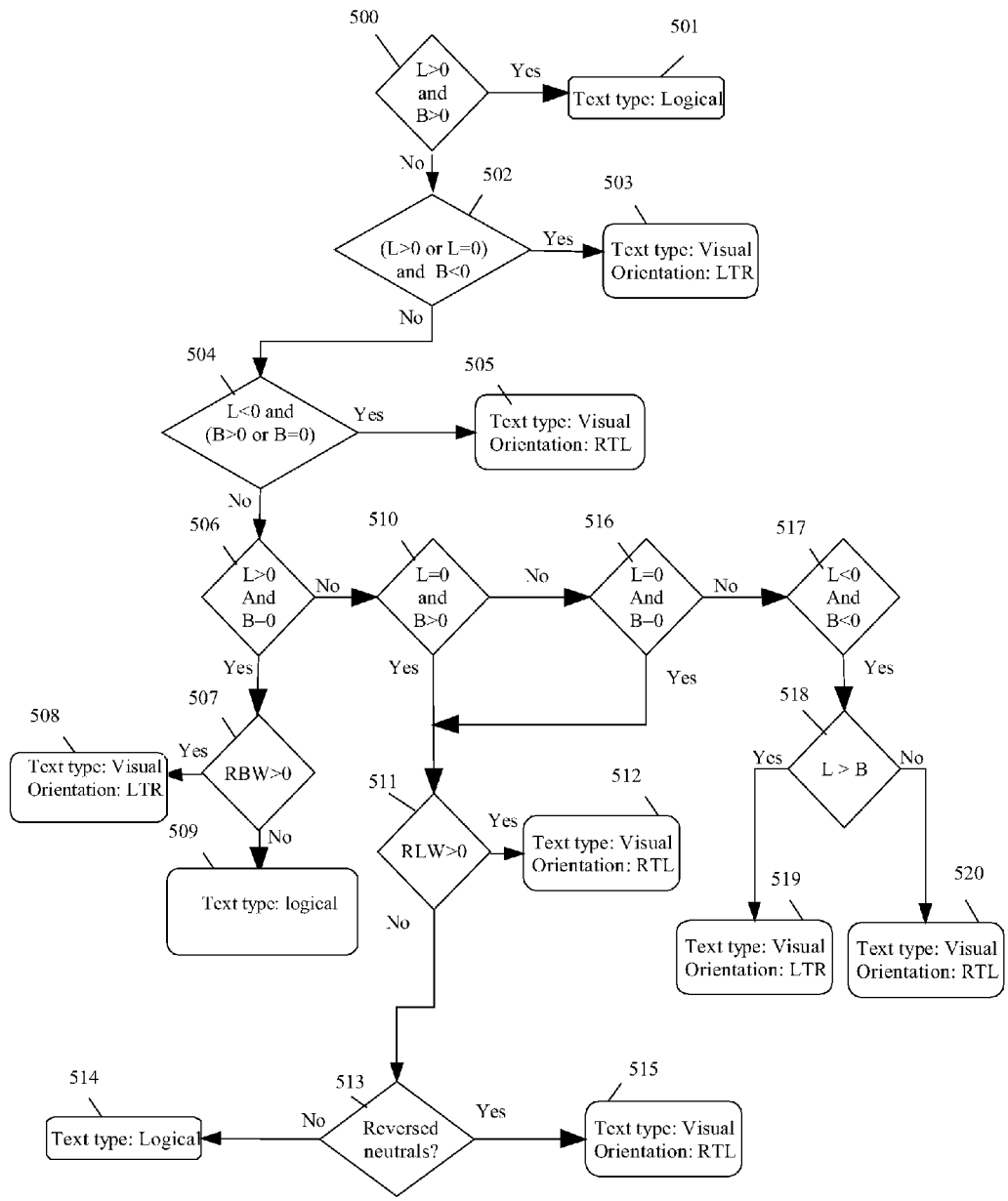
FIG. 5 shows a flowchart describing the determination of the text type and text orientation attributes based on the four BIDI parameters.

FIG. 5 illustrates the detection of the text type and the text orientation using the parameters L and B.

In step 500, it is determined if L and B are both strictly positive, in other words if the number of non-BIDI word LW is strictly superior to the number of non-BIDI words in a reverse letter order RLW and if the number of BIDI words BW is strictly superior to the number of BIDI words in a reverse letter order BLW.

If the condition of step 500 is satisfied, the step 501 sets text type attribute to a LOGICAL value. Text orientation attribute is then determined from the first character of the text: if the first character of the text is a character related to the non-BIDI languages, text orientation attribute is set to an LTR value and otherwise, text orientation attribute is set to an RTL value.

If the condition of step 500 is not satisfied, then step 502 checks if L is strictly positive or equal to zero and B is strictly negative, in other words if the number of non-BIDI word LW is higher or equal to the number of non-BIDI words in a reverse letter order RLW and if the number of BIDI words BW is strictly inferior to the number of BIDI words in a reverse letter order RBW.

The condition of step 502 includes two sub-conditions C1 and C2:

C1: L>0 and B>0, or
C2: L=0 and B>0

When C2 is satisfied, the text does not comprise any non-BIDI text.

If the condition of step 502 is satisfied then text type attribute is set to a VISUAL value and text orientation attribute is set to an LTR value in step 503.

If the condition of step 502 is not satisfied, then step 504 checks if L is strictly negative and B is strictly positive or equal to zero, in other words if the number of non-BIDI word LW is strictly inferior to the number of non-BIDI words in a reverse letter order RLW and if the number of BIDI words BW is higher or equal to the number of BIDI words in a reverse letter order BLW.

The condition of step 504 includes two sub-conditions C11 and C22:

C11: L<0 and B>0, or
C22: L<0 and B=0

When C22 is satisfied, the text does not comprise any BIDI text.

If the condition of step 504 is satisfied then text type attribute is set to a VISUAL value and text orientation attribute is set to an RTL value in step 505.

If the condition of step 504 is not satisfied, then step 506 determines if L is strictly positive and B is equal to zero, in other words if the number of non-BIDI word LW is strictly superior to the number of non-BIDI words in a reverse letter order RLW and if the number of BIDI words BW is equal to the number of BIDI words in a reverse letter order BLW. This condition expresses that the text does not contain any BIDI text.

If the condition of step 506 is satisfied, then step 507 further checks if the number of BIDI words in a reverse letter order RBW is strictly positive, and if so text type attribute is set to a VISUAL value and text orientation attribute is set to an LTR value in step 508.

If the further condition of step 507 is not satisfied, then text type attribute is set to a LOGICAL value in step 509. Text orientation attribute is then determined from the first character of the text: if the first character of the text is a character related to the non-BIDI languages, text orientation attribute is set to an LTR value, and otherwise, text orientation attribute is set to an RTL value.

If the condition of step 506 is not satisfied, then step 510 determines if L is equal to zero and B is strictly positive, in other words if the number of non-BIDI word LW is equal to the number of non-BIDI words in a reverse letter order RLW and if the number of BIDI words BW is strictly superior to the number of BIDI words in a reverse letter order BLW. This condition expresses that the text does not contain any non-BIDI text.

If the condition of step 510 is satisfied, then step 511 further checks if the number of non-BIDI words in a reverse letter order RLW is strictly positive, and if so text type attribute is set to a VISUAL value and text orientation attribute is set to an RTL value in step 512.

If the further condition of step 510 is not satisfied, then step 513 is performed to check if the neutrals are reversed.

Neutrals or neutral characters designate characters that can be written either from right to left or from left to right, depending on the context. Exemplary neutral characters include:
- the paragraph separator,
- the segment separator (Tab)
- the whitespace (Space, figure space, line separator, form feed, General Punctuation spaces), etc.

If the neutrals are reversed, then step 515 sets text type to a VISUAL value and text orientation to an RTL value. If the neutrals are not reversed, then the text type attribute is set to a LOGICAL value in step 514. The text orientation attribute is then determined from the first character of the text: if the first character of the text is a character related to the non-BIDI languages, the text orientation attribute has an LTR value, otherwise, the text orientation attribute is detected as having an RTL value.

If the condition of step 510 is not satisfied, then step 516 determines if L and B are both equal to zero, i.e. if the number of non-BIDI word LW is equal to the number of non-BIDI words in a reverse letter order RLW and if the number of BIDI words BW is equal to the number of BIDI words in a reverse letter order BLW.

If the condition of step 516 is satisfied, then steps 511 to 515 are performed.

If the condition of step 516 is not satisfied, then step 517 determines if L and B are both strictly negative, i.e. if the number of non-BIDI word LW is strictly inferior to the number of non-BIDI words in a reverse letter order RLW and if the number of BIDI words BW is strictly inferior to the number of BIDI words in a reverse letter order BLW.

If condition 517 is satisfied, then step 518 further checks if L is strictly superior to B. If the further condition 518 is satisfied, then text type is detected as visual and text orientation is detected as LTR in step 519. If the further condition of step 517 is not satisfied, then text type is set to visual and text orientation is set to RTL in step 520.

The method, according to embodiments of the invention, accordingly allows for automatic and efficient detection of text type and text orientation attributes. This has particular advantages for text processing applications such as displaying, sorting, searching applications for which the memory representation and text manipulation differ depending on the text type and text orientation. For example:
- for a text that does not contain any BIDI text, the memory representation and text manipulation for Visual text type and LTR orientation are the same as for Logical text type and LTR orientation LTR
- for a text that does not contain any non-BIDI text, the memory representation and text manipulation for Visual text type and RTL orientation are the same as for Logical text type and RTL orientation, except for numbers and neutrals.

Figure 6:
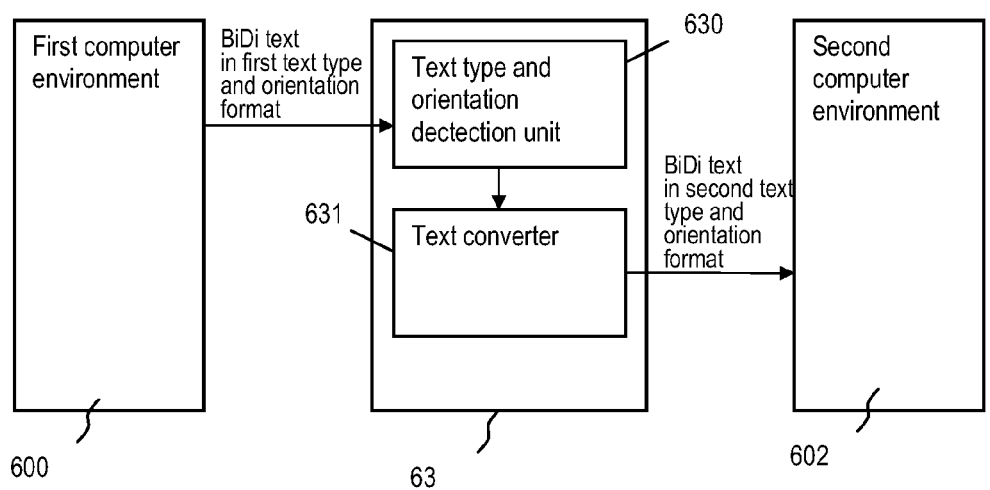
FIG. 6 shows an exemplary hardware environment using the system for detecting text type and text orientation attributes.

FIG. 6 illustrates an exemplary embodiment of the invention for layout transformation of a BIDI text for text exchange between two different computer environments 600 and 602.

The first computer environment 600 is adapted to support BIDI text according to a first text type and first text orientation. The second computer environment 602 is adapted to support BIDI text according to a second text type and second text orientation. The first computer environment 600 is configured to exchange bi-directional data with the second computer environment through any suitable communication means.

The BIDI text is initially stored in the first computer environment according to the first text type and first text orientation. If the first computer environment 600 needs to transfer the BIDI text to the second computer system 602, the BIDI text is retrieved from the memory of first computer system 600. A conversion system 63 is further provided to convert the BIDI text in the text type and text orientation supported by the second computer system 602. The conversion system 63 includes a detection unit 630 for detecting the text type and text orientation of the BIDI text to be transferred to the second system as described above in accordance with the embodiments of the invention, and a converter 631 for converting the text into the second text type and text orientation supported by the second computer system 602 based on the result of the detection. The second computer system 602 thus automatically receives the BIDI text in the format it supports.

Even if the conversion system 63 is represented as separated from the first computer system 600 and the second system 602, those skilled in the art will understand that the conversion unit 63 can be totally or partially integrated in the destination computer system 602.

The first computer system 600 can be for example a legacy environment such as z/OS or iSeries having Visual text type, while the second computer system 602 can be a windows environment having a logical type and provided with a number of text processing applications such as displaying, searching, printing, storing, sorting applications. In the prior art, it was not possible to efficiently run text processing applications on the destination computer system (602), such as displaying, searching, printing and sorting applications, for BIDI texts. By providing an improved solution to automatically detect text type and text orientation, embodiments of the invention allow for asynchronous and efficient BIDI layout transformation.

FIG. 6 has been described with reference to two separate computer environments. However, embodiments of the invention also apply to two different computer systems in a same environment and even for exchange between two software applications that reside on a same computer system.

More generally, embodiments of the invention have particular advantages for BIDI data transformation applications that transform a BIDI text from one computer system to any other destination computer system having a different data layout and orientation. In such applications, it is required to transform the text data layout and orientation into the text layout and orientation of the destination environment. For example, in the process of extracting BIDI data from a visual layout environment and use this data in building charts or statistical tables that assumes the data is in logical layout, it is required to identify the source data layout and orientation in order to correctly transform the data into the designated layout and orientation.

Embodiments of the invention accordingly foster BIDI text exchange between different environments servers (like, iSeries, zSeries, Windows Server, etc) while preventing text corruption. With the invention, text manipulation (like text display, search, sort, etc.) of a text can be done correctly with no need for the system administrator or application user to know the text type and orientation.

Embodiments of the invention obviate the need for manual configuration, thereby limiting the risk of human errors, and overcoming the problem of text corruption.

Embodiments of the invention further reduce the overhead of determining these text type and text orientation properties for each segment of BIDI data.

Embodiments of the invention do not require any preliminary assumption on the text type. Further it is not limited to any BIDI language.

Even if not limited to such applications, embodiments of the invention have particular advantages for applications involving many sources so that it is difficult to configure BIDI layout for each of them and for applications where data are posted to a specific channel. For such applications, the source text can be read efficiently with no need to solve complex configuration problems.

More generally, embodiments of the invention facilitate the interchange of Arabic text between different BIDI layout formats and solve the current issues that stem from the diversity of the Arabic text layouts, in a transparent manner.

Embodiments of the invention can take the form of an entirely hardware embodiment, an entirely software embodiment or an embodiment containing both hardware and software elements. In particular it will be appreciated that while FIG. 4 is presented in the form of hardware, exactly equivalent effects could be achieved in software. In a preferred embodiment, Embodiments of the invention are implemented in software, which includes but is not limited to firmware, resident software, microcode, etc.

Furthermore, Embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The preceding description of preferred embodiments of the invention has been presented for the purposes of illustration. The description provided is not intended to limit the invention to the particular forms disclosed or described. Modifications and variations will be readily apparent from the preceding description. For example, while step 404 has been described as loading one unique dictionary or word list for each category type (BIDI or Non-BIDI), the skilled person will readily understand that the invention may also apply to cases where there are multiple dictionaries of the same category type (BIDI or Non-BIDI) loaded. This may occur in situations where there is a shortage in language identification process that could not identify the exact language of a group of languages have the same characters set. For example, the Microsoft codepage CP1256 is designated to allocate Arabic, Farsi, and Urdu characters set. For such cases, step 420 and step 421 will calculate the biggest values L and/or B of the dictionaries loaded in a same category. As a result, it is intended that the scope of the invention not be limited by the detailed description provided herein.

What is claimed is:

1. A method for processing a bidirectional text, wherein the method comprises:
dividing the text into a set of words;
determining a first parameter representing a number of non-bidirectional words in the text, a second parameter representing a number of bidirectional words in the text, a third parameter representing a number of non-bidirectional words in reverse letter order in the text, and a fourth parameter representing a number of bidirectional words in reverse letter order in the text;
determining a text type attribute and/or a text orientation attribute of the bi-directional text from the values of the first parameter, of the second parameter, of the third parameter and of the fourth parameters; and
storing the bidirectional text in a memory device according to the text type attribute and the text orientation attribute.

2. The method of claim 1, further comprising detecting languages used in the text, and for each detected language loading a corresponding language dictionary.

3. The method of claim 2, wherein determining the first parameter, second parameter, third parameter, and fourth parameter comprises comparing each word in the set of words and a reverse word of each word with words contained in the loaded dictionary.

4. The method of claim 1, wherein determining the text type attribute and/or text orientation attribute comprises comparing the first parameter to the third parameter and the second parameter to the fourth parameter.

5. The method of claim 4, wherein in response to a determination that the first parameter is strictly superior to the third parameter, and that the second parameter is strictly superior to the fourth parameter, the text type attribute is set to a logical value, and determining the text type attribute and/or the text orientation attribute further comprises setting the text orientation attribute to a left-to-right value in response to determining that the first character in the text corresponds to a non-bidirectional character, and to a right-to-left value in response to determining that the first character in the text corresponds to a bidirectional language.

6. The method of claim 4, wherein the text type attribute is set to a visual value and the text orientation attribute is set to a left-to-right value, in response to determining that the first parameter is superior or equal to the third parameter, and that the second parameter is strictly inferior to the fourth parameter.

7. The method of claim 4, wherein the text type attribute is set to a visual value and the text orientation attribute is set to a right-to-left value, in response to determining that the first parameter is strictly inferior to the third parameter, and that the second parameter is superior or equal to the fourth parameter.

8. The method of claim 4, wherein the text type attribute is set to a visual value and the text orientation attribute is set to a left-to-right value, in response to determining that the first parameter is strictly superior to the third parameter, and the second parameter is equal to the fourth parameter, and that the fourth parameter is strictly positive.

9. The method of claim 4, wherein, in response to determining that the first parameter is strictly superior to the third parameter and the second parameter is equal to the fourth parameter, and that the fourth parameter is not strictly positive, the text type attribute is set to a logical value, and determining the text type attribute and/or the text orientation attribute further comprises setting the text orientation attribute to a left-to-right value if the first character in the text corresponds to a non-bidirectional character, and to a right-to-left value if the first character in the text corresponds to a bidirectional language.

10. The method of claim 4, wherein the text type attribute is set to a visual value and the text orientation attribute is set to a right-to-left value in response to determining that the first parameter is equal to the third parameter and that the second parameter is superior or equal to the fourth parameter and that the third parameter is strictly positive.

11. The method of claim 4, wherein determining the text type attribute and/or text orientation attribute further comprises, in response to determining that the first parameter is equal to the third parameter, and that the second parameter is superior or equal to the fourth parameter and that the third parameter is not strictly positive:
determining whether neutrals characters are reversed,
wherein in response to determining that the neutrals characters are reversed, setting the text type attribute to a visual value and the text orientation attribute to a right-to-left value,
wherein in response to determining that the neutrals characters are not reversed, setting the text type attribute to a logical value, and setting the text orientation attribute to a left-to-right value in response to determining that the first character in said text corresponds to a non-bidirectional character or to a right-to-left value in response to determining that the first character in said text corresponds to a bidirectional language.

12. The method of claim 4, wherein determining the text type attribute and/or the text orientation attribute comprises, in response to determining that the first parameter is strictly inferior to the third parameter, and the second parameter is strictly inferior to the fourth parameter:
setting the text type attribute to a visual value and the text orientation attribute to a left-to-right value, in response to determining that the difference between the first parameter and third parameter is strictly superior to the difference between the second parameter and the fourth parameter; and
setting the text type attribute to a visual value and the text orientation attribute to a right-to-left value, in response to determining that the difference between the first parameter and third parameter is inferior or equal to the difference between the second parameter and the fourth parameter.

13. A computer program product for a text processor, comprising:
a computer readable storage device to store a computer readable program, wherein the computer readable program, when executed on a computer, causes the computer to perform operations for processing a bidirectional text, the operations comprising:
dividing the text into a set of words;
determining a first parameter representing a number of non-bidirectional words in the text, a second parameter representing a number of bidirectional words in the text, a third parameter representing a number of non-bidirectional words in reverse letter order in the text, and a fourth parameter representing a number of bidirectional words in reverse letter order in the text; and
determining a text type attribute and/or a text orientation attribute of the bi-directional text from the values of the first parameter, of the second parameter, of the third parameter and the fourth parameters.

14. The computer program product of claim 13, further comprising detecting languages used in the text, and for each detected language loading a corresponding language dictionary.

15. The computer program product of claim 13, wherein determining the first parameter, second parameter, third parameter, and fourth parameter comprises comparing each word in the set of words and a reverse word of each word with words contained in the loaded dictionary.

16. The computer program product of claim 13, wherein determining the text type attribute and/or text orientation attribute comprises comparing the first parameter to the third parameter and the second parameter to the fourth parameter.

17. A system for processing bidirectional text, comprising:
a text tokenizer to divide the text into a set of words;
a word counter to determine a first parameter representing a number of non-bidirectional words in the text, a second parameter representing a number of bidirectional words in the text, a third parameter representing a number of non-bidirectional words in reverse letter order in the text, and a fourth parameter representing a number of bidirectional words in reverse letter order in the text;
a comparator to determine a text type attribute and/or a text orientation attribute of the bi-directional text from the values of the first parameter, of the second parameter, of the third parameter and the fourth parameters; and
a memory device to store the bidirectional text according to the text type attribute and the text orientation attribute.

18. The system of claim 17, further comprising a language identifier to detect languages used in the text, and for each detected language to load a corresponding language dictionary.

19. The system of claim 17, wherein the word counter is further configured to determine the first parameter, second parameter, third parameter, and fourth parameter by comparing each word in the set of words and a reverse word of each word with words contained in the loaded dictionary.

20. The system of claim 17, wherein the comparator is further configured to compare the first parameter to the third parameter, and the second parameter to the fourth parameter.

* * * * *